No. 871,024.
PATENTED NOV. 12, 1907.
J. W. BEATES.
WIND MOTOR.
APPLICATION FILED NOV. 6, 1906.
2 SHEETS—SHEET 2.
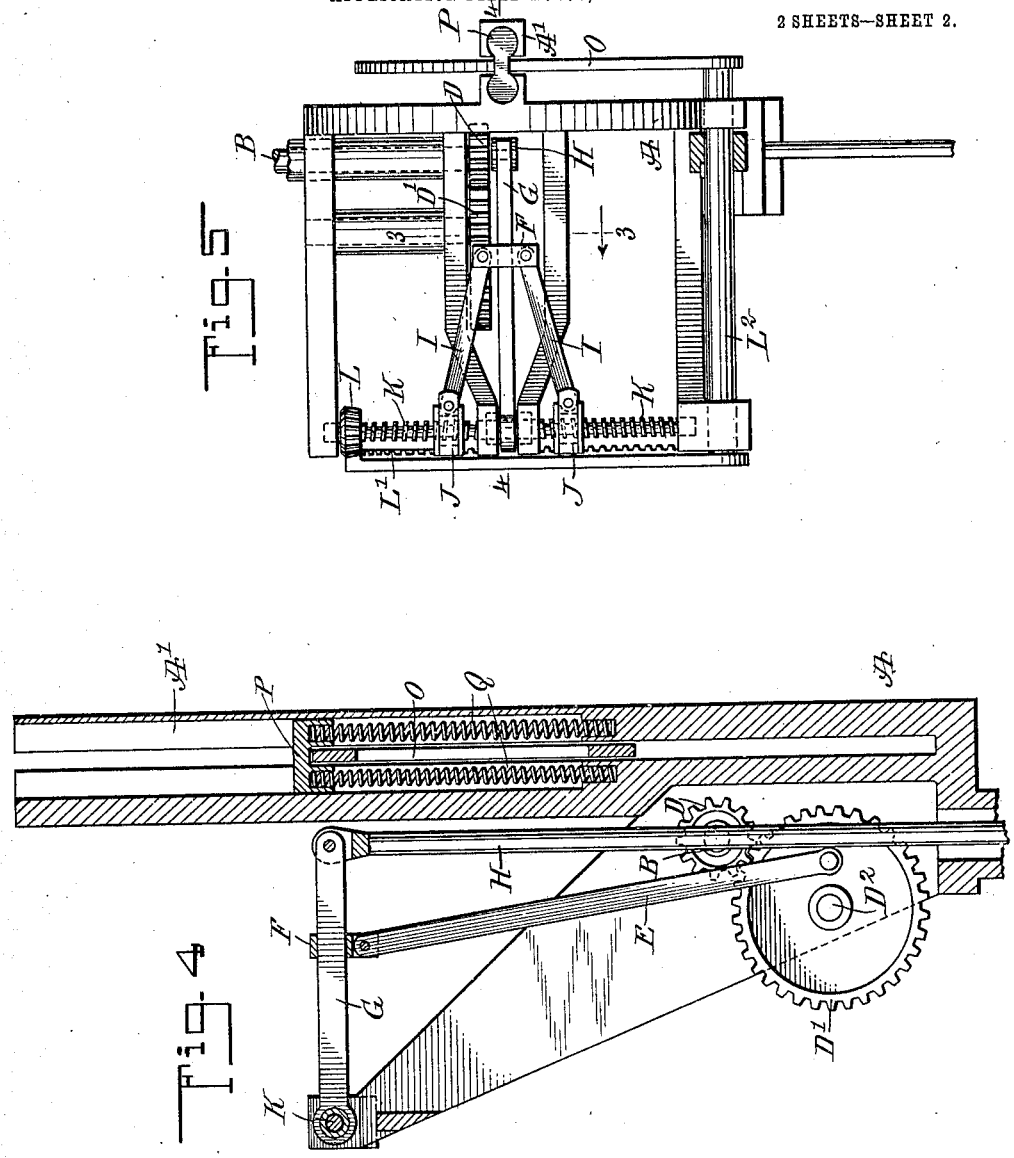

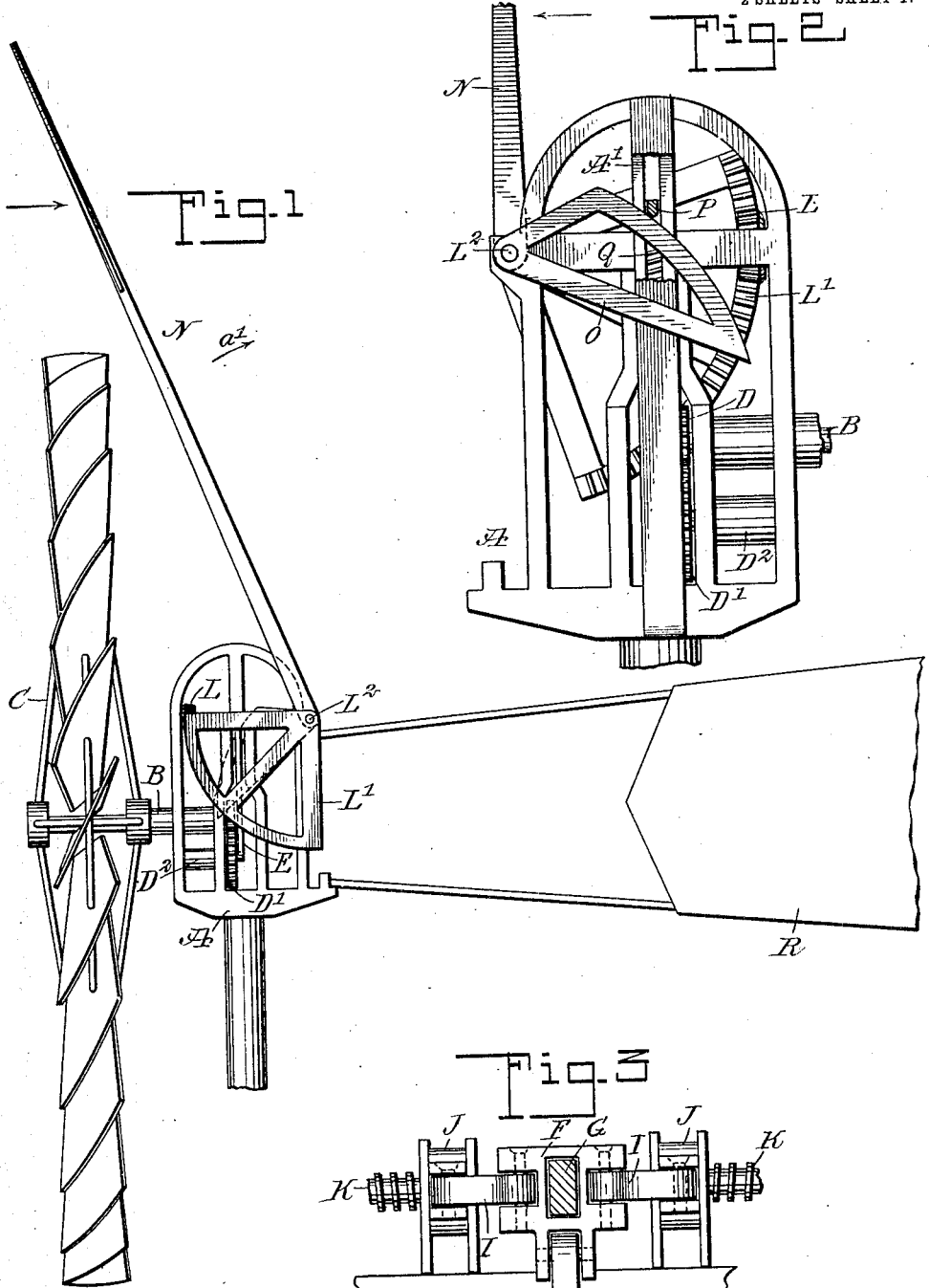

UNITED STATES PATENT OFFICE.

JAMES W. BEATES, OF DENVER, COLORADO.

WIND-MOTOR.

No. 871,024.

Specification of Letters Patent.

Patented Nov. 12, 1907.

Application filed November 6, 1906. Serial No. 342,231.

*To all whom it may concern:*

Be it known that I, JAMES W. BEATES, a citizen of the United States, and a resident of Denver, in the county of Denver and State of Colorado, have invented a new and Improved Wind-Motor, of which the following is a full, clear, and exact description.

The object of the invention is to provide a new and improved wind motor, arranged to utilize the motive power of the wind to the fullest advantage by varying the length of the stroke of the pump rod according to the velocity of the wind.

The invention consists of novel features and parts and combinations of the same which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement; Fig. 2 is an enlarged rear side elevation of the stroke-changing mechanism, parts being broken out; Fig. 3 is an enlarged transverse section of the same on the line 3—3 of Fig. 5; Fig. 4 is an enlarged sectional side elevation of the same on the line 4—4 of Fig. 5, and Fig. 5 is a plan view of the same.

The frame-work A of the motor is mounted to turn in the usual manner on a tower or other support, and on the said frame-work A is mounted the wind wheel shaft B carrying the wind wheel C of any approved construction. On the wind wheel shaft B is secured a pinion D in mesh with a gear wheel D' mounted to turn on a stud $D^2$ carried by the frame A, and the said gear wheel D' forms a crank wheel and is connected by a pitman E with a cross head F mounted to slide on a swing arm G pivotally connected at its free end with the pump rod H of a pump or other mechanism actuated by the wind motor.

The cross head F is pivotally connected by links I with nuts J screwing on the right and left hand screw threads of a screw rod K mounted to turn in suitable bearings arranged on the frame A, the axis of the screw rod K coinciding with the axis of the swing arm G fulcrumed on the frame A. On one end of the screw rod is a bevel gear wheel L in mesh with a segmental bevel gear wheel L' secured on a rock shaft $L^2$ journaled on the frame A and carrying a vane N under pressure of the wind whenever the wind wheel C is in the wind. On the rock shaft $L^2$ is secured a cam O engaged at its periphery by a block P mounted to slide vertically in suitable bearings A' arranged on the frame A, and the said block P is pressed on by springs Q in a downward direction, to insure a return rocking movement of the rock shaft $L^2$ on a decrease of the pressure of the wind. The frame A is provided with the usual vane R for holding the wind wheel C and the vane N in the wind.

The operation is as follows: Assuming that the parts of the stroke-changing mechanism are in the position illustrated in the drawings and the wind is blowing at a normally moderate velocity. Now when the velocity of the wind increases the vane N is swung rearward in the direction of the arrow a', so that the rock shaft $L^2$ is turned and the segmental gear wheel L' turns the pinion L and screw rod K to move the nuts J simultaneously outward and from each other, whereby the links I shift the block F on the swing arm G towards the latter's fulcrum. Now as the stroke of the pitman E is uniform but the cross head F is moved nearer to the axis of the arm G, it is evident that a longer stroke is given to the swing arm G and consequently to the pump rod H. When the rock shaft $L^2$ is rocked by the action of the vane N as above described, then an upward swinging movement is given to the cam O, so that the latter raises the block P against the tension of its springs Q, and when the velocity of the wind decreases then the springs Q under tension and acting on the block P cause a return swinging movement of the cam O, rock shaft $L^2$ and vane N, whereby the screw rod K is turned in the opposite direction and consequently the nuts J move towards each other and by the links I shift the cross head F outward on the arm G, that is, away from the axis thereof, so that the stroke of the swing arm G and that of the pump rod H is correspondingly decreased.

From the foregoing it will be seen that on an increase of the velocity of the wind the stroke of the pump rod H is increased, and on the decrease of the velocity of the wind the stroke of the pump rod is correspondingly decreased, and hence in a strong wind the lifting capacity of the pump actuated by the wind motor is correspondingly increased.

It is understood that in a wind motor working with a constant load, the work done varies only as the first power of the wind velocity, while when the load is increased with increasing velocity of the wind, the efficiency increases faster than the square of the velocity, and with an ideal or perfect wind motor the efficiency would increase as the cube of the velocity. Now by the arrangement described the increase in the stroke of the pump rod increases the load, and the decrease of the stroke diminishes the load, and as the stroke varies in proportion to the increase and decrease of the velocity of the wind it is evident that the motive power of the wind is utilized to the fullest advantage.

The improvement can be readily used with any kind of wind mill having an open wheel or a solid wheel, it being understood that the lengthening and shortening of the stroke of the pump rod is independent of the rotation of the wind wheel and the usual driving gear, such, for instance, as shown and consisting of the pinion D, gear wheel D′ and pitman E, or the usual crank arm directly on the wheel shaft and connected with the pump rod either directly or by a pitman.

The construction of the stroke-varying device may be greatly changed without deviating from my invention, hence I do not limit myself to the detail construction shown.

Having thus described my invention, I claim as new and desire to secure by Letters Patent:

1. A wind motor having a stroke changing device comprising a swing arm, a cross head movable on the said arm, a screw rod having a right hand and a left hand thread thereon, nuts carried by the screw rod, means for connecting the nuts with said cross head, and means controlled by the velocity of the wind for actuating said screw rod.

2. A wind motor having a stroke changing device comprising a swing arm, a cross head movable on said swing arm, a screw rod having a right hand and a left hand thread thereon, nuts carried by the screw rod, means for connecting the nuts with said cross head, a vane controlled by the pressure of the wind, and a driving connection between the said vane and the screw rod.

3. The combination with a wind motor, its driving gear, and a pump rod, of a stroke changing device comprising a swing arm connected with the pump rod, a cross head movable on the said arm, a screw rod having a right hand and a left hand thread thereon, bearings on the frame of the motor in which the screw rod is mounted to turn, nuts carried by the screw rod, links connecting the nuts with said cross head, a vane under pressure of the wind, and means for turning the screw rod from said vane to change the position of the cross head on the swing arm according to the velocity of the wind.

4. The combination with a wind motor, its driving gear, and the pump rod, of a variable mechanism interposed between the driving gear of the motor and the pump rod, the said variable mechanism comprising a swing arm, a cross head movable on the swing arm, a screw rod, bearings on the motor frame in which said screw rod is mounted to turn, means actuated by the movement of the screw rod and connected with the said cross head to move the same on the said swing arm, a vane under pressure of the wind, and a driving connection between the said vane and the screw rod.

5. The combination with a wind motor, its driving gear and the pump rod actuated by the motor, of a variable mechanism interposed between the driving gear of the motor and the pump rod, a vane under pressure of the wind, a rock shaft carrying said vane, means connected with the rock shaft for controlling the said variable mechanism in one direction, a cam secured on said rock shaft, and a spring actuated device engaging said cam for returning the rock shaft and vane and actuating the said variable mechanism in a reverse direction.

6. A wind motor having a stroke changing device comprising a swing arm, a cross head mounted to slide on said swing arm, a screw rod having a right hand and a left hand thread thereon, nuts carried by said screw rod, connections between the said nuts and the cross head, a pinion on the said screw rod, a rock shaft, a segmental gear wheel carried by said rock shaft, and in mesh with the said pinion, and a device under pressure of the wind and connected with the said rock shaft.

7. A wind motor having a stroke changing device comprising a swing arm, a cross head mounted to slide on the said swing arm, a screw rod having a right hand and a left hand thread thereon, nuts carried by said screw rod, connections between the nuts and the said cross head, a pinion on the said screw rod, a rock shaft, a segmental gear wheel carried by said rock shaft and in mesh with the said pinion, a device under pressure of the wind and connected with the said rock shaft, and a spring pressed device connected with the said rock shaft for imparting a return movement thereto.

8. A wind motor having a stroke changing device comprising a swing arm, a cross head mounted to slide on the said swing arm, a screw rod having a right hand and a left hand thread thereon, nuts carried by said screw rod, connections between the nuts and the said cross head, a pinion on the said screw rod, a rock shaft, a segmental gear wheel carried by said rock shaft and in mesh with said pinion, a device under pressure of the wind and connected with the said rock shaft to turn the same in one direction, a spring controlled block, bearings on the frame of the motor in which said block is mounted to slide, and a cam on the rock shaft for moving said block against the tension of its spring, the said block under tension of its spring imparting a return movement to the cam and rock shaft.

9. A wind motor having a stroke-changing device comprising a swing arm, a pump rod with which said swing arm is connected, a cross head mounted to slide on the said swing arm, a screw rod having a right hand and a left hand thread thereon and carrying nuts, links connecting the nuts with the said cross head, a pinion on the said screw rod, a rock shaft carrying a segmental gear wheel in mesh with the said pinion, and a vane under pressure of the wind and connected with the said rock shaft.

10. A wind motor having a stroke-changing device comprising a swing arm, a pump rod with which the swing arm is connected, a cross head mounted to slide on the said swing arm, a screw rod having a right hand and a left hand thread thereon and carrying nuts, links connecting the nuts with the said cross head, a pinion on the said screw rod, a rock shaft carrying a segmental gear wheel in mesh with the said pinion, a vane under pressure of the wind and connected with the said rock shaft, and a spring-pressed device connected with the said rock shaft for imparting a return movement thereto.

11. A wind motor having a stroke-changing device comprising a swing arm, a pump rod with which the swing arm is connected, a cross head mounted to slide on the said swing arm, a screw rod having a right hand and a left hand thread thereon and carrying nuts, links connecting the nuts with the said cross head, a pinion on the said screw rod, a rock shaft carrying a segmental gear wheel in mesh with the said pinion, a vane under pressure of the wind and connected with the said rock shaft, a cam on the said rock shaft, and a spring-pressed block engaging the said cam.

12. The combination with a wind wheel, its shaft, a pinion on said shaft, and a gear wheel in mesh with said pinion, of a pitman connected with said gear wheel, a cross head connected with said pitman, a swing arm extending through said cross head and on which the latter is mounted to slide, the said swing arm being fulcrumed at one end, a device connected with the other end of the swing arm to be actuated thereby, and a vane controlled mechanism for changing the position of the cross head on the swing arm.

13. The combination with a wind motor, its shaft and mechanism actuated by the wind motor, of a stroke changing device interposed between the motor shaft and the said mechanism for changing the stroke of the latter, the said stroke changing device comprising a cross head, means connecting said cross head with the motor shaft, a swing arm extending through said cross head and on which the latter is mounted to slide, the said swing arm being fulcrumed at one end and connected at its other end with the mechanism actuated by the motor, and a vane controlled mechanism connected with the cross head for changing the position of the latter on the swing arm.

14. A wind motor having a stroke changing device comprising a swing arm, a cross head movable on the said arm, a rod, bearings in which the rod is mounted to turn, means actuated by the movement of the rod and connected with the cross head to move the same on the swing arm and means controlled by the velocity of the wind for actuating said rod.

15. A wind motor having a stroke changing device comprising a swing arm, a cross head mounted to slide on said swing arm, a rock shaft, mechanism actuated by the rock shaft for moving the cross head on said swing arm, and a device under pressure of the wind and connected with the said rock shaft.

16. A wind motor having a stroke changing device comprising a swing arm, a cross head mounted to slide on said swing arm, a vane under pressure of the wind, a rock shaft carrying said vane, mechanism actuated by the rock shaft for moving the cross head on said swing arm, and means connected with the rock shaft, for imparting a return movement thereto.

In testimony whereof I have signed my name to this specification in the presence of two subscribing witnesses.

JAMES W. BEATES.

Witnesses:
 A. V. GROCE,
 E. T. BURNS.